(12) United States Patent
Inaba et al.

(10) Patent No.: US 7,129,679 B2
(45) Date of Patent: Oct. 31, 2006

(54) POWER SUPPLY CIRCUIT HAVING SOFT START

(75) Inventors: Katsumi Inaba, Tondabayashi (JP); Tsutomu Satoh, Yamatotakada (JP); Hirohisa Warita, Nara (JP); Atsushi Kanamori, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 59 days.

(21) Appl. No.: 10/982,826

(22) Filed: Nov. 8, 2004

(65) Prior Publication Data
US 2005/0110469 A1    May 26, 2005

(30) Foreign Application Priority Data
Nov. 25, 2003  (JP) ............................. 2003-393340

(51) Int. Cl.
*G05F 1/10* (2006.01)
(52) U.S. Cl. ...................... 323/222; 323/901
(58) Field of Classification Search ............. 323/901, 323/908, 222; 363/49
See application file for complete search history.

(56) References Cited

U.S. PATENT DOCUMENTS

| | | | |
|---|---|---|---|
| 5,350,997 A * | 9/1994 | Ghotbi et al. ............... 323/268 |
| 5,998,977 A * | 12/1999 | Hsu et al. .................... 323/272 |
| 6,185,082 B1 * | 2/2001 | Yang ............................. 361/90 |
| 6,198,258 B1 * | 3/2001 | Ando et al. ................. 323/222 |
| 6,285,170 B1 * | 9/2001 | Matsumoto et al. ........ 323/222 |
| 6,534,961 B1 * | 3/2003 | Brandt ......................... 323/282 |
| 6,737,845 B1 * | 5/2004 | Hwang ........................ 323/284 |
| 6,972,547 B1 * | 12/2005 | Murakami .................. 323/267 |

FOREIGN PATENT DOCUMENTS

JP          11-69793 A        3/1999
JP          2000-324807 A     11/2000

* cited by examiner

*Primary Examiner*—Karl Easthom
*Assistant Examiner*—Harry R Behm
(74) *Attorney, Agent, or Firm*—Birch, Stewart, Kolasch & Birch LLP

(57) ABSTRACT

The voltage booster type switching power supply circuit is provided with a drive circuit for controlling a switching element, a start/stop circuit for turning the drive circuit on and off according to a brightness control signal for adjusting a brightness of a light source of a liquid crystal display device, an output voltage detection circuit for detecting whether the output voltage is greater than a predetermined voltage and feeding out a result as a comparison result signal, and a soft-start circuit that does not operate when the comparison result signal is active on the rising edge of the brightness control signal, and that operates so as to increase the output voltage gradually when the comparison result signal is inactive on the rising edge of the brightness control signal.

12 Claims, 8 Drawing Sheets

POWER SUPPLY CIRCUIT HAVING SOFT START

BACKGROUND OF THE INVENTION

This nonprovisional application claims priority under 35 U.S.C. §119(a) on Patent Application No. 2003-393340 filed in Japan on Nov. 25, 2003, the entire contents of which are hereby incorporated by reference.

FIELD OF THE INVENTION

The present invention relates to a power supply circuit for supplying power by boosting an input voltage of a DC power source, and in particular, to a power supply circuit for repeating start/stop voltage boosting operations according to PWM (Pulse Width Modulation) signals.

Description of the Prior Art

An electronic apparatus such as a portable telephone, a PDA (Persona Digital Assistant), or a digital camera is equipped with a liquid crystal display (LCD). In recent years, a white light-emitting diode has been increasingly used as one of light sources (back light or front light) for the LCD due to its superior properties in durability, light-emitting efficiency, and space required thereby. The white light-emitting diode requires a relatively high forward voltage to operate. Used as a light source are a plurality of white light-emitting diodes which are connected in series so as to make brightness of individual diodes evenly. A voltage higher than a voltage supplied from a battery built in a mobile apparatus is required to drive these white light-emitting diodes.

Conventionally, a power supply circuit of voltage boosting type shown in FIG. 9 has been used as a circuit for driving the white light-emitting diodes. FIG. 9 is a block circuit diagram showing an electronic configuration of a conventional power supply circuit. The power supply circuit shown in FIG. 9 comprises a DC power source 1 such as a lithium-ion battery, an input capacitor 2, a coil 3, a diode 4, an output capacitor 5, a resistor (output current detection resistor) R1, and a boost chopper regulator 10 that performs voltage boosting operation by switching between operations for accumulating and discharging energy in and from the coil 3. The boost chopper regulator 10 is integrated into an IC package. Six white light-emitting diodes (load) LED1 to LED6, as a light source for an LCD, are driven by this power supply circuit.

A negative terminal of the DC power source 1 is connected to ground. A positive terminal thereof is connected to one end of the input capacitor 2 and to one end of the coil 3 as well. Other end of the input capacitor 2 is connected to ground. Other end of the coil 3 is connected to an anode of the diode 4, and a cathode of the diode 4 is connected to ground through the output capacitor 5. A series circuit consisting of the white light-emitting diodes LED1 to LED6 and the resistor R1 is connected in parallel to the output capacitor 5.

The voltage boost chopper regulator 10 is provided with a power supply terminal Vi as a terminal for external connection, a ground terminal GND, an output voltage monitoring terminal Vo, a feedback terminal FB, and a control terminal CTRL. The power supply terminal Vi is connected to the positive terminal of the DC power source, and the ground terminal GND is connected to ground. With this configuration, the voltage boost chopper regulator 10 is fed with power from the DC power source 1 as driving power. Furthermore, a switching terminal Vsw is connected to a node between the coil 3 and the diode 4. The output voltage monitoring terminal Vo is connected to the cathode of the diode 4. The feedback terminal FB is connected to a node between the white light-emitting diode LED6 and the resistor R1. Fed to the control terminal CTRL is, as will be described later, a brightness control signal (external input signal) for adjusting brightness of the white light-emitting diodes LED1 to LED6.

Next, an internal configuration of the voltage boost chopper regulator 10 and connections therein will be described. The voltage boost chopper regulator 10 comprises N-channel FETs (switching elements) 11 and 12, a drive circuit 13, a current detection comparator 14, an oscillation circuit 15, an amplifier 16, a PWM comparator 17, an error amplifier 18, a reference power source 19, resistors R2, R3, and R4, a soft-start circuit 20, a start/stop circuit 21, an overheating protection circuit 22, and an overvoltage protection circuit 23.

Drains of the FETs 11 and 12 are connected to the switching terminal Vsw together, and gates thereof are connected to the drive circuit 13 together. A source of the FET 12 is connected to ground, and a source of the FET 11 is connected to ground through the resistor R2. Both ends of the resistor R2 are connected to two input terminals of the current detection comparator 14 respectively. An output from the current detection comparator 14 and one of two outputs from the oscillation circuit 15 are added together by the amplifier 16 and fed to one input terminal of the PWM comparator 17. In addition, an output from the PWM comparator 17 and other of two outputs from the oscillation circuit 15 are fed to the drive circuit 13 respectively.

An output from the error amplifier 18 is fed to other input terminal of the PWM comparator 17. One input terminal of the error amplifier 18 is connected to the feedback terminal FB. Other input terminal of the error amplifier 18 is connected to one respective end of the resistors R3 and R4. Other end of the resistor R4 is grounded, and other end of the resistor R3 is connected to a positive terminal of the reference power source 19. A negative terminal of the reference power source 19 is connected to ground.

Each respective output from the soft-start circuit 20, the start/stop circuit 21, the overheating protection circuit 22, and the overvoltage protection circuit 23 is fed to the drive circuit 13. A brightness control signal is fed to the soft-start circuit 20 and the start/stop circuit 21 through the control terminal CTRL. An output voltage Vout is fed to the overvoltage protection circuit 23 through the output voltage monitoring terminal Vo.

Next, how the power supply circuit configured in this way operates will be described. Across the output capacitor 5, the power supply circuit shown in FIG. 9 produces the output voltage Vout which is boosted from the input voltage Vin supplied from the DC power source 1 as a result of the FET 12 being turned on and off by the drive circuit 13. To be more specific, when the FET 12 is turned on by receiving a predetermined gate voltage at the gate thereof from the drive circuit 13, current flows through the coil 3 from the DC power source 1 and, thereby the coil 3 accumulates energy therein. When the FET 13 is turned off by not receiving the predetermined gate voltage at the gate thereof, the accumulated energy in the coil 3 is released, thereby causing a back electromotive force in the coil 3.

The back electromotive force produced in the coil 3 is superimposed on the input voltage Vin supplied from the DC power source 1, and the resulting voltage charges the output capacitor 5 through the diode 4. A repetition of these operations will cause voltage boosting operation, which eventually causes the output voltage Vout to be produced across the output capacitor 5. By this output voltage Vout, the output current Iout flows through the white light-emitting diodes LED1 to LED6 so that the white light-emitting diodes LED1 to LED6 emit light.

A feedback voltage Vfb obtained by multiplying a value of the output current Iout by a resistance value of the resistor R1, is fed to the one input terminal of the error amplifier 18 through the feedback terminal FB. Then, the feedback voltage Vfb is compared with a reference voltage Vref that is supplied to the other input terminal of the error amplifier 18. Here, the reference voltage Vref is such a voltage obtained by dividing the voltage of the reference power source 19 by the resistors R3 and R4. Because of this arrangement, a voltage appearing at the output of the error amplifier 18 represents a difference between the feedback voltage Vfb and the reference voltage Vref, and is, then, fed to the one input terminal of the PWM comparator 17.

Fed to the other input terminal of the PWM comparator 17 is a signal resulted from adding and amplifying two signals by the amplifier 16; one signal being proportional to current flowing through the resistor R2 when the FET 11 is turned on; and other signal being a sawtooth waveform signal fed from the oscillation circuit 15. The resultant signal is compared with a level of the output voltage fed from the error amplifier 18. Depending on the comparison result, during a period in which the level of the output voltage fed from the error amplifier 18 is higher than the level of the signal fed from the amplifier 16, a PWM output of the PWM comparator 17 becomes "H" (High) level. During a period in which the level of the output voltage fed from the error amplifier 18 is lower than the level of the signal fed from the amplifier 16, the PWM output of the PWM comparator 17 becomes "L" (Low) level.

The drive circuit 13, by receiving the PWM output from the PWM comparator 17, turns on and off the FETs 11 and 12 according to a duty cycle of the PWM output. In other words, the drive circuit 13 feeds a predetermined gate voltage to the FETs 11 and 12 to turn them on at start timing of each cycle of a clock signal fed from the oscillation circuit 15 when the PWM output from the PWM comparator 17 is at "H" level. Thereafter, when the PWM output from the PWM comparator becomes "L" level, the drive circuit 13 stops feeding the gate voltage to the FETs 11 and 12, thereby to turn them off.

When the FETs 11 and 12 are controlled on and off in this way, a voltage boosting operation is performed so that the feedback voltage Vfb becomes equal to the reference voltage Vref. In other words, the output current Iout will be stabilized at a level equal to a current value obtained by dividing the reference voltage Vref (this being equal to the feedback voltage Vfb) by the resistance value of the resistor R1. In addition, because the signal being compared by the PWM comparator 17 includes a signal based on current flowing through the resistor R2, i.e., a signal based on current flowing in the coil 3 when the FETs 11 and 12 are turned on, a peak current allowed to flow in the coil 3 can also be limited.

Furthermore, by detecting that the output voltage Vout exceeds a predetermined overvoltage protection voltage, the overvoltage protection circuit 23 stops the operation of the drive circuit 13. This function prevents an overvoltage exceeding the predetermined overvoltage protection voltage from being applied to the white light-emitting diodes LED1 to LED6 and the output capacitor 5. The overheating protection circuit 22, by detecting overheating caused by the operation of the drive circuit 13 and, in particular, overheating of and around the FET 12, stops the operation of the drive circuit 13. This function protects the voltage boost chopper regulator 10 against failure and breakdown caused by overheating.

The start/stop circuit 21, in accordance with the external input signal fed to the control terminal CTRL, instructs the drive circuit 13 so as to start and stop the driving operations of the FETs 11 and 12. Therefore, it is possible to adjust the brightness of the white light-emitting diodes LED1 to LED6 by feeding, as an external input signal, a brightness control signal in the form of PWM signal.

To be more specific, when the brightness control signal fed to the control terminal CTRL is at "H" level, the start/stop circuit 21 instructs the drive circuit 13 to start the driving operation of the FETs 11 and 12 so as to allow the output current Iout to flow through the white light-emitting diodes LED1 to LED6. When the brightness control signal is at "L" level, the start/stop circuit 21 instructs the drive circuit 13 to stop the driving operation of the FETs 11 and 12 so as to allow the output voltage Vout to drop. As a result, an average current flowing through the white light-emitting diodes LED1 to LED6 changes according to the duty cycle of the brightness control signal. Because the brightness of the white light-emitting diodes LED1 to LED6 is proportional to this average current, the brightness thereof is adjusted in the manner described above.

The soft-start circuit 20, by instructing the drive circuit 13 to change the output duty cycle gradually at startup, is to increase the output voltage Vout gradually. Unless the output voltage Vout is increased gradually, an excessive amount of charging current flows from the DC power source 1 if the output capacitor 5 has not been charged. When this happens and if the DC power source 1 is a battery such as a lithium-ion battery, a burden is placed on the battery. Moreover, it is possible that the battery voltage drops due to the excessive amount of charging current, causing a problem in which the battery can not be fully used until the battery voltage reaches a discharge end voltage thereof.

FIGS. 10 and 11 are waveform diagrams each showing voltage waveforms and a current waveform at specific portions of the power supply circuit shown in FIG. 9. FIG. 10 shows waveforms when the soft-start circuit 20 is not operating, and FIG. 11 shows waveforms when the soft-start circuit 20 is operating. In FIGS. 10 and 11, a symbol W1 represents a voltage waveform of the brightness control signal to be fed to the control terminal CTRL. A symbol W2 represents a voltage waveform of the output voltage Vout. A symbol W3 represents a current waveform of the input current Iin. In FIGS. 10 and 11, time t0 indicating a time when the brightness control signal turns from "L" to "H" for the first time after startup, represents the startup timing of the power supply circuit shown in FIG. 9. At time t0, the input voltage Vin is supplied from the DC power source 1. Until time t0, the output voltage Vout has been 0V, and the output capacitor 5 has not been charged at all.

First, the voltage boosting operation when the soft-start circuit 20 is not operating will be described with reference to FIG. 10. In FIG. 10, at startup (time t0), i.e., when the brightness control signal turns from "L" level to "H" level for the first time (waveform W1), the drive circuit 13 starts the voltage boosting operation. Since the soft-start function is not operating, the output voltage Vout rises to a voltage V1 immediately (waveform W2). At this moment, because the input current Iin serves as a current for charging the output capacitor 5 at the voltage V1, an amount of the current becomes excessively high (waveform W3).

Here it is to be noted that the boosted output voltage Vout allows the output current Io to flow through the white light-emitting diodes LED1 to LED6 and the resistor R1, and causes the feedback voltage Vfb to be generated. The output voltage Vout, when the feedback voltage Vfb is so regulated as to be equal to the reference voltage Vref, is referred to as the voltage Vi. Then, as the output capacitor 5 is charged, a level of the input current Iin decreases and becomes constant at time t1 (waveform W3).

Next, at time t2, when the brightness control signal turns to "L" level (waveform W1), the start/stop circuit 21 stops the voltage boosting operation of the drive circuit 13. Then, the output voltage Vout becomes equal to the input voltage Vin of the DC power source 1 (waveform W2), and the input current Iin stops flowing (waveform W3).

Then, at time t2 and thereafter, when the brightness control signal is switched between "H" and "L" levels according to a predetermined duty cycle (waveform W1), the output voltage Vout is switched between the voltages V1 and the input voltage Vin in accordance with the brightness control signal (waveform W2). The input current Iin that flows when the output voltage Vout is switched from the input voltage Vin to the voltage V1 will be such a charging current for charging the output capacitor 5 with a voltage equivalent to a difference between the voltage V1 and the input voltage Vin, because the output capacitor C5 has been charged to the level of the input voltage Vin. Therefore, the input current Iin does not become an excessive current (waveform W3).

Described above is the voltage boosting operation when the soft-start circuit 20 is not operating. As explained, the problem is that the input current Iin becomes excessive at startup (time to). As a result, because an excessive current for charging the output capacitor 5 flows out from the DC power source 1 which is a battery in this example, a heavy burden is imposed on the battery. At the same time, the battery voltage drops because of this excessive amount of charging current, preventing the battery from being used until the battery voltage reaches its original discharge end voltage. The soft-start circuit 20 is provided to solve this problem.

Next, the voltage boosting operation when the soft-start circuit 20 is operating will be described with reference to FIG. 11. In FIG. 11, at startup (time to), i.e., when the brightness control signal turns from "L" level to "H" level for the first time (waveform W1), the drive circuit 13 starts the voltage boosting operation. Simultaneously, the soft-start circuit 20 changes the output duty cycle of the drive circuit 13 gradually. Once the output voltage Vout reaches the level of the input voltage Vin, the output voltage Vout rises to the voltage V1 gradually (waveform W2). At this moment, because the input current Iin serves as a current for charging the output capacitor 5 at the voltage Vin, the input current Iin does not become an excessive current (waveform W3). After that, as the charging of the output capacitor 5 progresses, the level of the input current Iin decreases and becomes constant at time t1 (waveform W3).

Next, at time t2, when the brightness control signal turns to "L" level (waveform W1), the start/stop circuit 21 stops the voltage boosting operation of the drive circuit 13. Then, the output voltage Vout becomes equal to the input voltage Vin of the DC power source 1 (waveform W2), and the input current Iin stops flowing (waveform W3).

Then, at time t2 and thereafter, the brightness control signal is switched between "H" and "L" levels according to a predetermined duty cycle (waveform W1). When the brightness control signal is switched from "L" level to "H" level, the soft-start circuit 20 controls the switching operation of the drive circuit 13 so that the output voltage Vout rises to the voltage V1 gradually. When the brightness control signal is switched from "H" level to "L" level, the output voltage Vout becomes equal to the voltage V1 instantaneously (waveform W2). The input current Iin that flows when the output voltage Vout rises from the input voltage Vin to the voltage V1 will be such a charging current for charging the output capacitor 5 with a voltage equivalent to an increased amount of voltage, because the output capacitor 5 has been already charged to a voltage equivalent to the input voltage Vin. Therefore, the input current Iin does not become an excessive current (waveform W3). In this way, when the soft-start circuit 20 functions, it is possible to prevent the input current Iin from increasing excessively and prevent, thereby, the DC power source 1 from being damaged.

A similar technology utilizing a soft-start circuit is disclosed in Japanese Patent Application Laid-Open No. H11-069793. According to the disclosure, when a capacitor for a soft start is charged at startup, a soft-start control signal corresponding to the charged voltage is fed out. A switching power unit, based on the soft-start control signal, controls a switching element so as to increase a duty cycle gradually. As a result of this, it is possible to protect the switching element from damage.

Furthermore, Japanese Patent Application Laid-Open No. 2000-324807 discloses a boost chopper switching regulator incorporating input and output cutoff switches. In this regulator, a switch for limiting current and a switch for preventing current from flowing for a certain period of time are used as the input and output cutoff switches. Because of this arrangement, it is possible to turn on the input and output cutoff switches, when the regulator starts a boosting operation, so as to prevent inrush current from flowing to an output capacitor from an input power source.

According to the conventional power supply circuit shown in FIG. 9, since the soft-start circuit 20 comes into operation every time the brightness control signal rises to "H" level so as to increase the output voltage Vout gradually, the output voltage Vout is unable to rise to the voltage V1 instantaneously. For this reason, it is not possible to feed a constant output current Io through the white light-emitting diodes LED1 to LED6, and it is thereby difficult to perform a desired brightness control in accordance with a duty cycle of the brightness control signal.

According to the conventional technology described in Japanese Patent Application Laid-Open No. H11-069793, it is possible to prevent the switching element from being damaged even when the switching power unit is started up again. However, when the switching power unit is repeatedly turned on and off at short intervals, an output voltage rises slowly every time it is turned on due to the soft-start operation and does not reach a desired voltage. Therefore, it becomes difficult to perform a desired brightness control based on the duty cycle of the brightness control signal.

Furthermore, according to the conventional technology described in Japanese Patent Application Laid-Open No. 2000-324807, since a combination of the switches that can limit current and the switches that can prevent current from flowing for a certain period of time is used, the circuit becomes complicated, and it becomes difficult to control the output voltage according to the duty cycle of the brightness control signal.

SUMMARY OF THE INVENTION

The present invention, in light of above-mentioned drawbacks, provides a power supply circuit capable of limiting excessive current flowing at startup and bringing an output voltage to a desired voltage instantaneously even when voltage boosting operations are repeated on and off according to PWM signals.

The present invention provides a voltage booster type switching power supply circuit for boosting an input voltage supplied from a DC power source by means of PWM (Pulse Width Modulation) method so as to supply a predetermined output voltage to a load. The voltage booster type switching power supply circuit comprises a coil having one end thereof connected to one end of the DC power source, a rectifying element connected between other end of the coil and one end of the load, an output current detection resistor for detecting current flowing through the load, an output capacitor, connected between a node at which the rectifying element and the load are connected together and ground, for producing the output voltage across both ends thereof by being electrically charged, a switching element connected between the other end of the coil and ground, a drive circuit for stabilizing the output voltage by controlling the switching element by means of PWM method in accordance with a voltage appearing across the output current detection resistor, a start/stop circuit for regulating an amount of the output current by starting and stopping the drive circuit according to an external input signal fed externally thereto, and a soft-start circuit for controlling the drive circuit so as to increase the output voltage gradually by becoming operative when the external input signal becomes active for the first time after startup, and controlling the drive circuit so as to increase the output voltage promptly by becoming inoperative when the external input signal becomes active for the second time and thereafter after startup.

By this arrangement, it is possible for the soft-start circuit to become operative by detecting a low output voltage at startup and, thereby prevent a current flowing from the DC power source from becoming excessive. Once the output voltage has risen, by inactivating the soft-start circuit, it is possible to stabilize the output voltage instantaneously and supply a stabilized load current even when the drive circuit is repeatedly controlled on and off according to the external input signal.

According to another aspect of the invention, the voltage booster type switching power supply circuit activates the soft-start circuit only during the first rising period of the external input signal following startup. To perform this operation, there is provided the output voltage detection circuit for feeding out a comparison result signal by comparing the output voltage with a predetermined voltage, a feedback voltage detection circuit for feeding out a comparison result signal by comparing a voltage appearing across the output current detection resistor with a predetermined voltage, or the input voltage detection circuit for feeding out a comparison result signal by comparing the input voltage with a predetermined voltage. By this arrangement, it becomes possible, with a simplified circuit, to compare the output voltage, the voltage appearing across the output current detection resistor, or the input voltage with a predetermined voltage and, based on the comparison result, operate the soft-start circuit securely only during the first rising period of the external input signal.

DESCRIPTION OF THE DRAWINGS

This and other features of the present invention will become clear from the following description, taken in conjunction with the preferred embodiments with reference to the accompanying drawings in which.

DESCRIPTION OF THE PREFERRED EMBODIMENT

Figure 1:
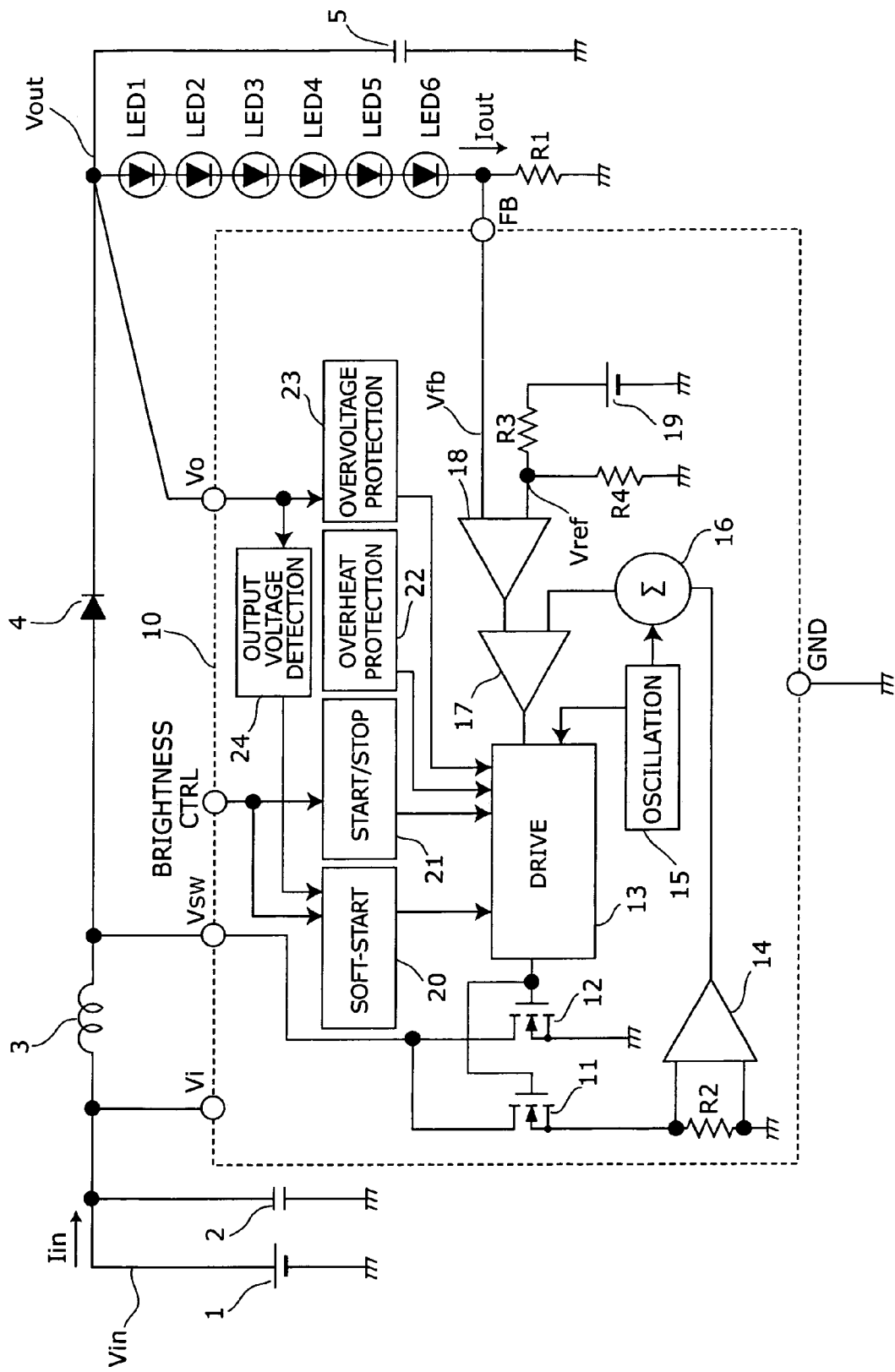
FIG. 1 is a circuit block diagram showing an electronic configuration of a power supply circuit of a first embodiment of the invention.
Figure 9:
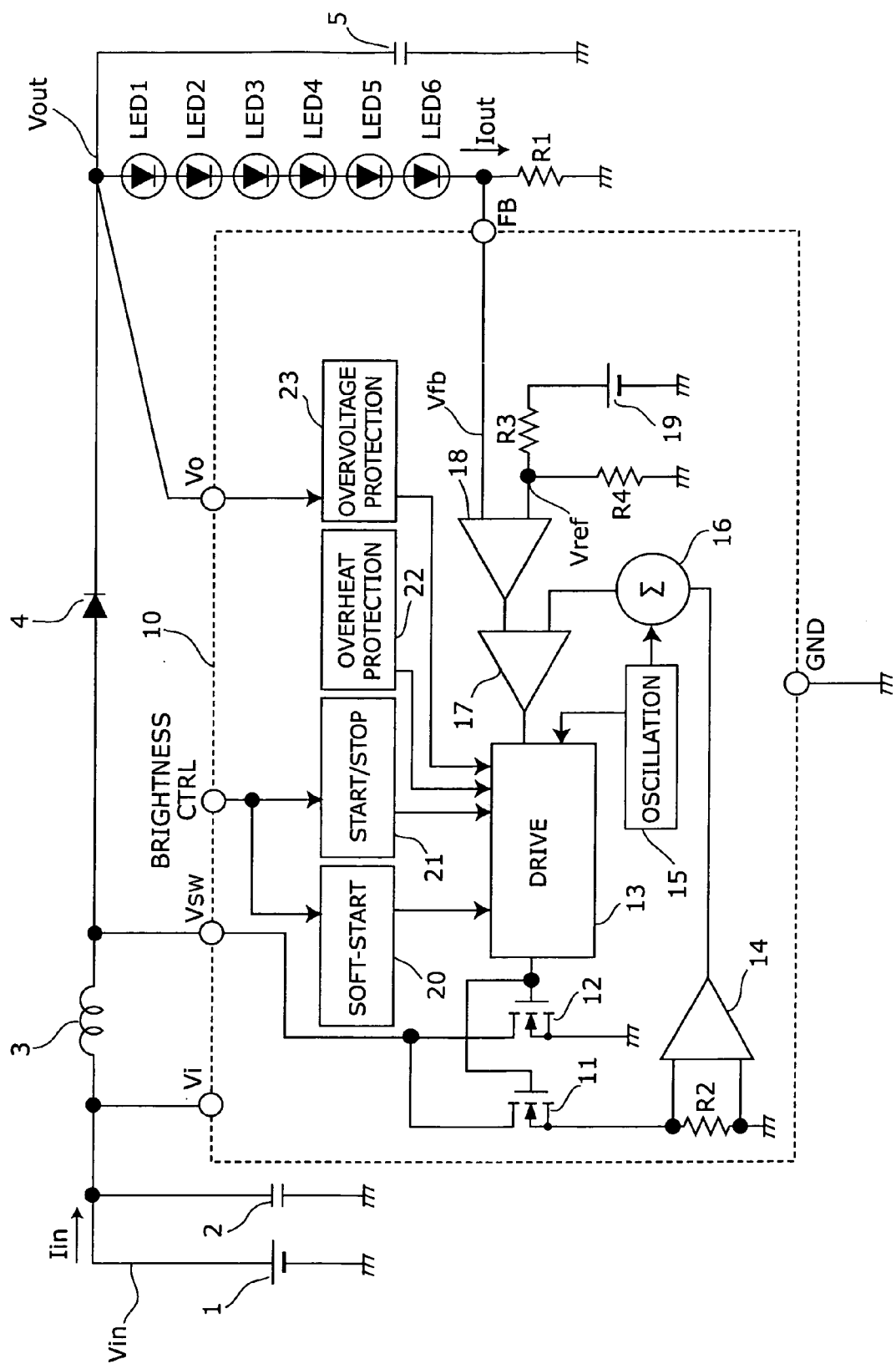
FIG. 9 is a circuit block diagram showing an electronic configuration of a conventional power supply circuit.
Figure 10:
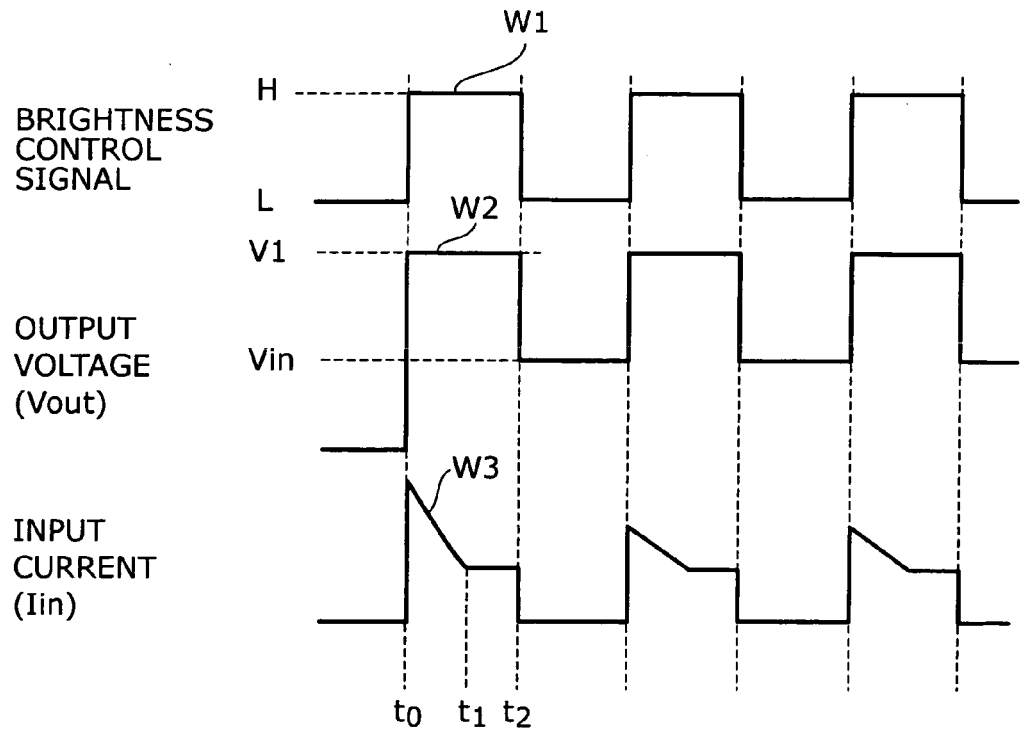
FIG. 10 is a waveform diagram showing voltage waveforms and a current waveform at different portions of the power supply circuit shown in FIG. 9.
Figure 11:
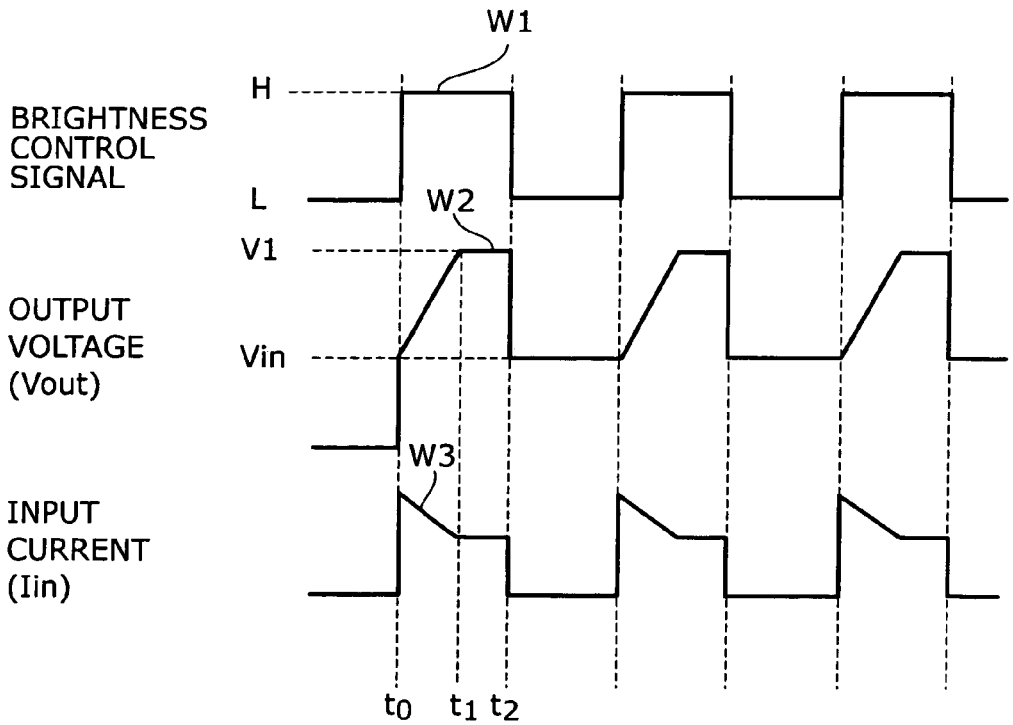
FIG. 11 is a waveform diagram showing voltage waveforms and a current waveform in another state at different portions of the power supply circuit shown in FIG. 9.

Hereinafter, embodiments of the present invention will be described with reference to the drawings. FIG. 1 is a circuit block diagram showing an electronic configuration of a power supply circuit of a first embodiment of the invention. In FIG. 1, such components as are found also in FIG. 9 are identified with the same reference numerals and descriptions thereof will not be repeated. The power supply circuit shown in FIG. 1 is different from the power supply circuit shown in FIG. 9 and is additionally provided with an output voltage detection circuit 24 in the boost chopper regulator 10.

The output voltage detection circuit 24 is connected between the output voltage monitoring terminal Vo and the soft-start circuit 20 so as to compare the output voltage Vout fed through the output voltage monitoring terminal Vo with a set voltage Vset. A comparison result signal obtained thereby is then fed to the soft-start circuit 20. The output voltage detection circuit 24 described above can be configured by using, for example, a circuit shown in FIG. 2.

Figure 2:
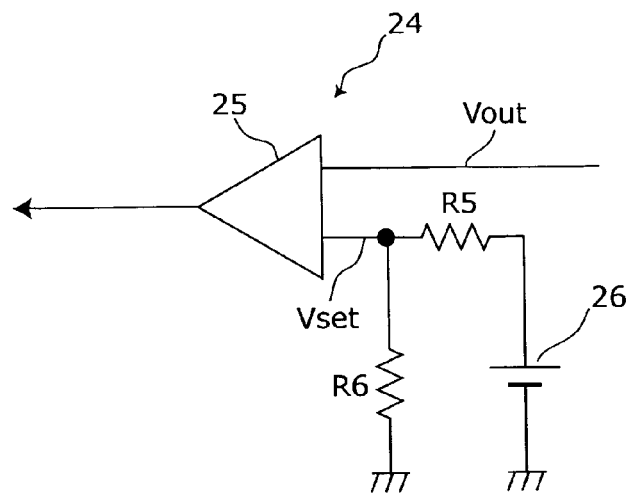
FIG. 2 is a circuit diagram showing an electronic configuration of an output voltage detection circuit shown in FIG. 1.

FIG. 2 is a circuit diagram showing an electronic configuration of the output voltage detection circuit 24 shown in FIG. 1. The output voltage detection circuit 24 shown in FIG. 2 is comprised of a comparator 25, a reference power source 26, and resistors R5 and R6. A set voltage Vset, obtained by dividing a voltage of the reference power source 26 by the resistors R5 and R6, is fed to one input terminal of the comparator 25. The output voltage Vout is fed to other input terminal of the comparator 25 through the output voltage monitoring terminal Vo. An output from the comparator 25 is fed to the soft-start circuit 20.

The output voltage detection circuit 24, configured in this way, compares the output voltage Vout with the set voltage Vset and feeds a comparison result signal to the soft-start circuit 24. For example, when the output voltage Vout is greater than the set voltage Vset, the comparison result signal turns to "H" level. When the output voltage Vout is smaller than the set voltage Vset, the comparison result signal turns to "L" level.

The soft-start circuit 20 is switched between an operative state and an inoperative state according to the state of the comparison result signal fed from the output voltage detection circuit 24 and determined on the rising edge of the brightness control signal. To be more specific, when the comparison result signal is at "H" level on the rising edge of the brightness control signal, then the soft-start circuit 20 turns to the inoperative state. When the comparison result signal is at "L" level on the rising edge of the brightness control signal, then the soft-start circuit 20 turns to the operative state to thereby control the drive circuit 13 so as to perform a soft start. Hereinafter, operations of the power supply circuit shown in FIG. 1 will be described with reference to FIG. 3.

Figure 3:
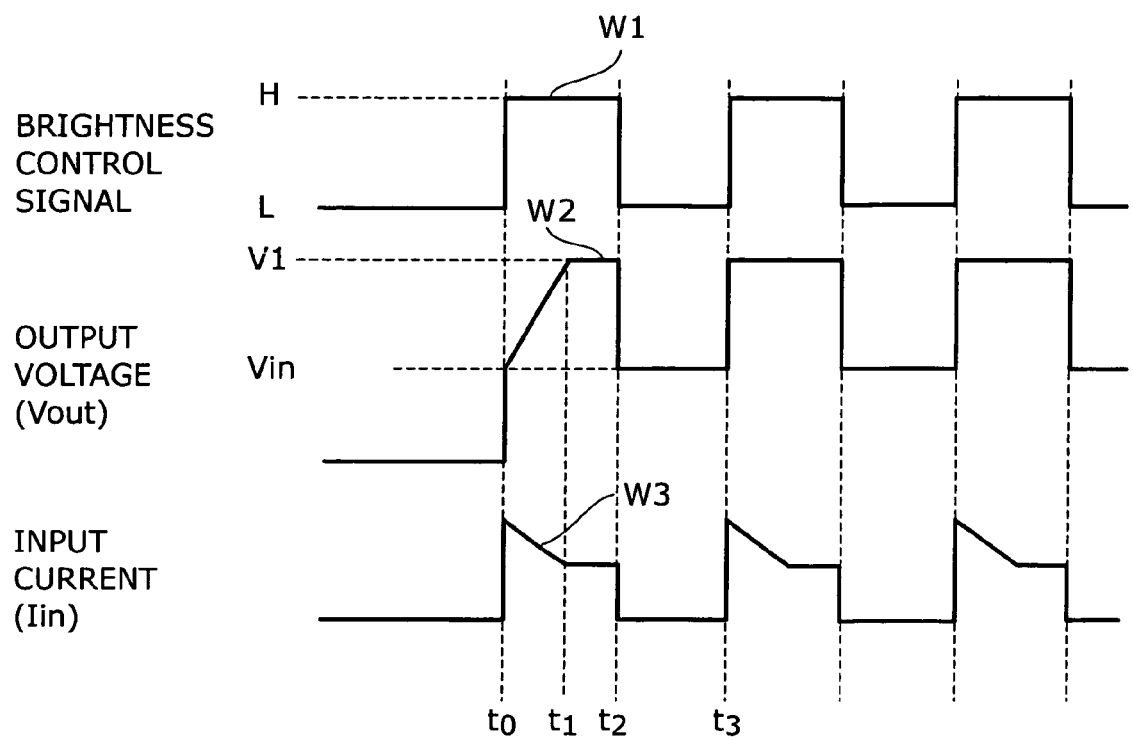
FIG. 3 is a waveform diagram showing voltage waveforms and a current waveform at different portions of the power supply circuit shown in FIG. 1.

FIG. 3 is a waveform diagram showing voltage waveforms and a current waveform at different portions of the power supply circuit shown in FIG. 1. In FIG. 3, alphanumeric references W1, W2, and W3 indicate a voltage waveform of the brightness control signal fed to the control terminal CTRL, a voltage waveform of the output voltage Vout, and a current waveform of the input current Iin respectively. Time t0, indicating the time when the brightness control signal turns from "L" to "H" for the first time, represents the startup timing of the power supply circuit shown in FIG. 1. Then, at time to, the input voltage Vin is supplied from the DC power source 1. Until time t0, the output voltage Vout has been 0 V, and the output capacitor 5 has not been charged at all.

In FIG. 3, at startup (time to), i.e., when the brightness control signal rises from "L" level to "H" level for the first time (waveform W1), the output voltage Vout is smaller than the set voltage Vset because the output capacitor C5 has not been charged. Therefore, the output from the output voltage detection circuit 24 is at "L" level. Then, the soft-start circuit 20 starts its operation by confirming that the output from the output voltage detection circuit 24 is at "L" level at this moment. Simultaneously, the drive circuit 13 starts the voltage boosting operation. In parallel with this operation, the soft-start circuit 20 controls the drive circuit 13 so that the output duty cycle therefrom changes gradually. Once the output voltage Vout reaches the level of the input voltage Vin, the output voltage Vout starts climbing to the voltage V1 gradually (waveform W2). Since the input current Iin at startup serves as a charging current for charging the output capacitor 5 at the input voltage Vin, the amount of current will not become excessive (waveform W3). After that, as the charging of the output capacitor 5 progresses, the level of the input current Iin decreases and becomes constant at time t1 (waveform W3).

Next, at time t2, when the brightness control signal turns to "L" level (waveform W1), the start/stop circuit 21 stops the voltage boosting operation of the drive circuit 13. Then, the output voltage Vout becomes equal to the input voltage Vin of the DC power source 1 (waveform W2), and the input current Iin stops flowing (waveform W3).

Then, at time t2 and thereafter, the brightness control signal is switched between "H" and "L" levels according to a predetermined duty cycle (waveform W1). The soft-start circuit 20 turns to the inoperative state by confirming on the rising edge of the brightness control signal that the output from the output voltage detection circuit 24 is at "H" level. This is because the output capacitor C5 has been already charged to the level of the input voltage Vin, the output voltage Vout is equal to the level of the input voltage Vin and greater than the set voltage Vset.

As a result, the output voltage Vout switches between the voltage V1 and the input voltage Vin instantaneously according to the brightness control signal (waveform W2). The input current Iin that flows when the output voltage Vout is switched from the input voltage Vin to the voltage V1 will be such a charging current for charging the output capacitor 5 with a voltage equivalent to a difference between the voltage V1 and the input voltage Vin, because the output capacitor C5 has been already charged to the level of the input voltage Vin. Therefore, the input current Iin does not become an excessive current (waveform W3).

In this way, at startup, the output voltage Vout is increased gradually by the soft-start circuit 20 so as to prevent the input current Iin from increasing excessively. Thereafter, when the voltage boosting operation is repeatedly turned on and off in accordance with the brightness control signal, it is possible to raise the output voltage Vout to a desired voltage instantaneously. By this function, it is possible to realize a power supply circuit capable of regulating the brightness to a desired level according to the brightness control signal fed thereto externally.

Figure 4:
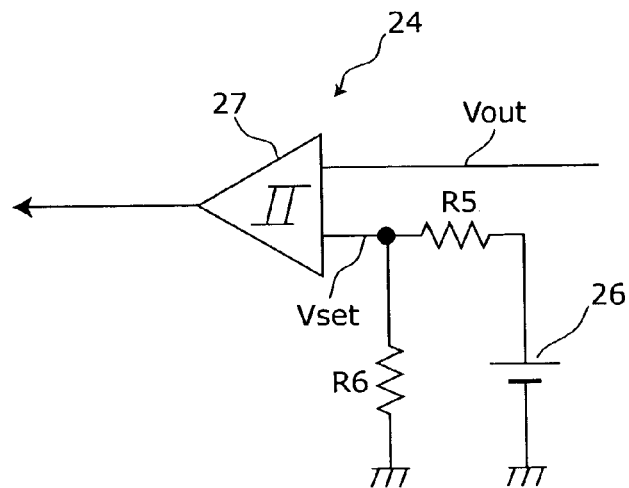
FIG. 4 is a circuit diagram showing another electronic configuration of the output voltage detection circuit shown in FIG. 1.

FIG. 4 is a circuit diagram showing another electronic configuration of the output voltage detection circuit 24 shown in FIG. 1. In FIG. 4, such components as are found also in FIG. 1 are identified with the same reference numerals and descriptions thereof will not be repeated. The output voltage detection circuit 24 shown in FIG. 4 is different from the output voltage detection circuit 24 shown in FIG. 2 and is provided, instead of the comparator 25, with a comparator 27 having a hysteresis characteristic. Fed to one input terminal of the comparator 27 is a set voltage Vset obtained by dividing the voltage of the reference power source 26 with resistors R5 and R6. This set voltage Vset displays a hysteresis characteristic depending on an output from the comparator 27. For example, when the output from the comparator 27 is at "L" level, then the set voltage Vset is 4.2 V, and, when the output from the comparator 27 is at "H" level, then the set voltage Vset is 3.0 V.

Described below with reference to FIG. 3 is how the power supply circuit shown in FIG. 1 will operate when the aforementioned output voltage detection circuit 24 is used. The soft-start circuit 20 turns to the operative state and performs the soft-start operation when the output from the output voltage detection circuit 24 is at "L" level on the rising edge of the brightness control signal, and turns to the inoperative state and does not perform the soft-start operation when the output from the output voltage detection circuit 24 is at "H" level on the rising edge of the brightness control signal. In FIG. 3, at startup (time t0), i.e., when the brightness control signal rises from "L" level to "H" level for the first time (waveform W1), the output from the output voltage detection circuit 24 is checked by the soft-start circuit 20. At this moment, the output voltage Vout is smaller than 4.2 V because the output capacitor C5 has not been charged. As a result, the output from the output voltage detection circuit 24 is at "L" level by which the soft-start circuit 20 is switched to the operative state.

Consequently, at this timing, the drive circuit 13 starts the voltage boosting operation. Simultaneously, the soft-start circuit 20 is activated to change the output duty cycle of the drive circuit 13 gradually. Once the output voltage Vout reaches the input voltage Vin, it will rise gradually to the voltage V1 (waveform W2).

However, the input current Iin flowing during this period, i.e., time t0 to time t1, is not an excessive current, because the output capacitor 5 has been already charged to 4.2 V and the input current Iin serves as a current to charge the output capacitor 5 with a voltage portion exceeding 4.2 V. At the same time, while the output voltage Vout is rising, the output voltage Vout goes beyond the set voltage Vset of 4.2 V, thereby causing the comparator 27 to output "H" level and the set voltage Vset to change to 3.0 V.

Next, at time t2, when the brightness control signal is turned to "L" level (waveform W1), the start/stop circuit 21 stops the voltage boosting operation of the drive circuit 13. Then, the output voltage Vout becomes equal to the input voltage Vin of the DC power source 1 (waveform W2), and the input current Iin stops flowing (waveform W3).

Then, at time t2 and thereafter, the brightness control signal is switched between "H" and "L" levels according to a predetermined duty cycle (waveform W1). At time t3, the second rise of the brightness control signal, the output capacitor has been already charged to the input voltage Vin. Therefore, the output Vout is equal to or higher than the input voltage Vin and greater than 3.0 V. Accordingly, the output from the output voltage detection circuit 24 is kept at "H" level and thereby, the soft-start circuit 20 is in the inoperative state.

Because the soft-start circuit 20 is inoperative at time t3, the output voltage Vout switches from the input voltage Vin to the voltage V1 instantaneously according to the brightness control signal (waveform W2). The input current Iin flowing when the output voltage Vout switches from the input voltage Vin to the voltage V1 does not become excessive, because the output capacitor 5 has been already charged to the input voltage Vin and the input current Iin serves as a current to charge the output capacitor 5 with a voltage equivalent to a difference between the voltage V1 and the input voltage Vin (waveform W3).

In this way, at startup, the output voltage Vout is increased gradually by the soft-start circuit 20 so as to prevent the input current Iin from becoming excessive. Thereafter, when the voltage boosting operation is repeatedly turned on and off in accordance with the brightness control signal, it is possible to raise the output voltage Vout to a desired voltage instantaneously. The same effect is achieved by using the output voltage detection circuit 24 shown in FIG. 2. However, it is possible, by using the output voltage detection circuit 24 shown in FIG. 4, to simplify the configuration of the soft-start circuit 20, because the soft-start circuit 20 can be simply switched between the operative state and the inoperative state by checking the output from the output voltage detection circuit 24 on the rising edge of the brightness control signal.

Furthermore, if the comparator 27 having a hysteresis characteristic is used for the output voltage detection circuit 24 and the set voltages Vset are set at 4.2 V and 3.0 V, it is possible to effectively use a lithium-ion battery of which a charge end voltage is 4.2 V and a discharge end voltage is 3.0 V.

Figure 5:
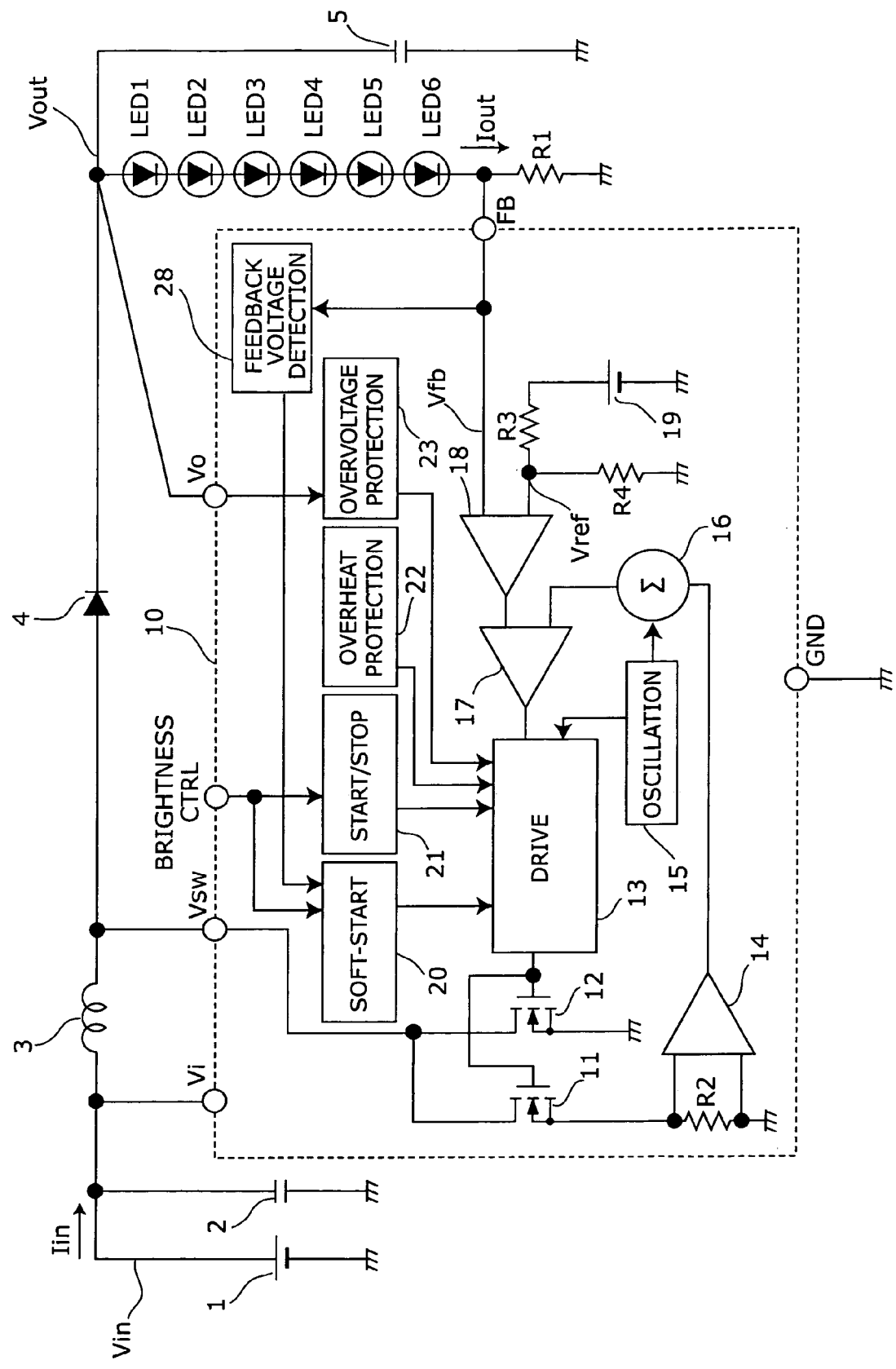
FIG. 5 is a circuit block diagram showing an electronic configuration of a power supply circuit of a second embodiment of the invention.

FIG. 5 is a circuit block diagram showing an electronic configuration of a power supply circuit of a second embodiment of the invention. In FIG. 5, such components as are found also in FIG. 1 are identified with the same reference numerals and descriptions thereof will not be repeated. The power supply circuit shown in FIG. 5 is different from the power supply circuit shown in FIG. 1 and is provided with a feedback voltage detection circuit 28 instead of the output voltage detection circuit 24.

The feedback voltage detection circuit 28 is connected between the feedback terminal FB and the soft-start circuit 20, compares the feedback voltage Vfb fed through the feedback terminal FB with the set voltage Vset, and feeds the comparison result signal to the soft-start circuit 20. In the power supply circuit shown in FIG. 5, the voltage to be used for deciding whether the soft-start circuit 20 is turned to the operative state or the inoperative state is changed from the output voltage Vout in FIG. 1 to the feedback voltage Vfb.

Because the feedback voltage Vfb is proportional to the output voltage Vout, the feedback voltage detection circuit 28 can be realized by configuring a similar circuit as, for example, the output voltage detection circuit 24 shown in FIG. 2 or FIG. 4 and changing the level of the set voltage Vset. In this arrangement, since the power supply circuit shown in FIG. 5 functions in a similar manner and produces a similar effect as the power supply circuit shown in FIG. 1, descriptions thereof will be omitted.

Figure 6:
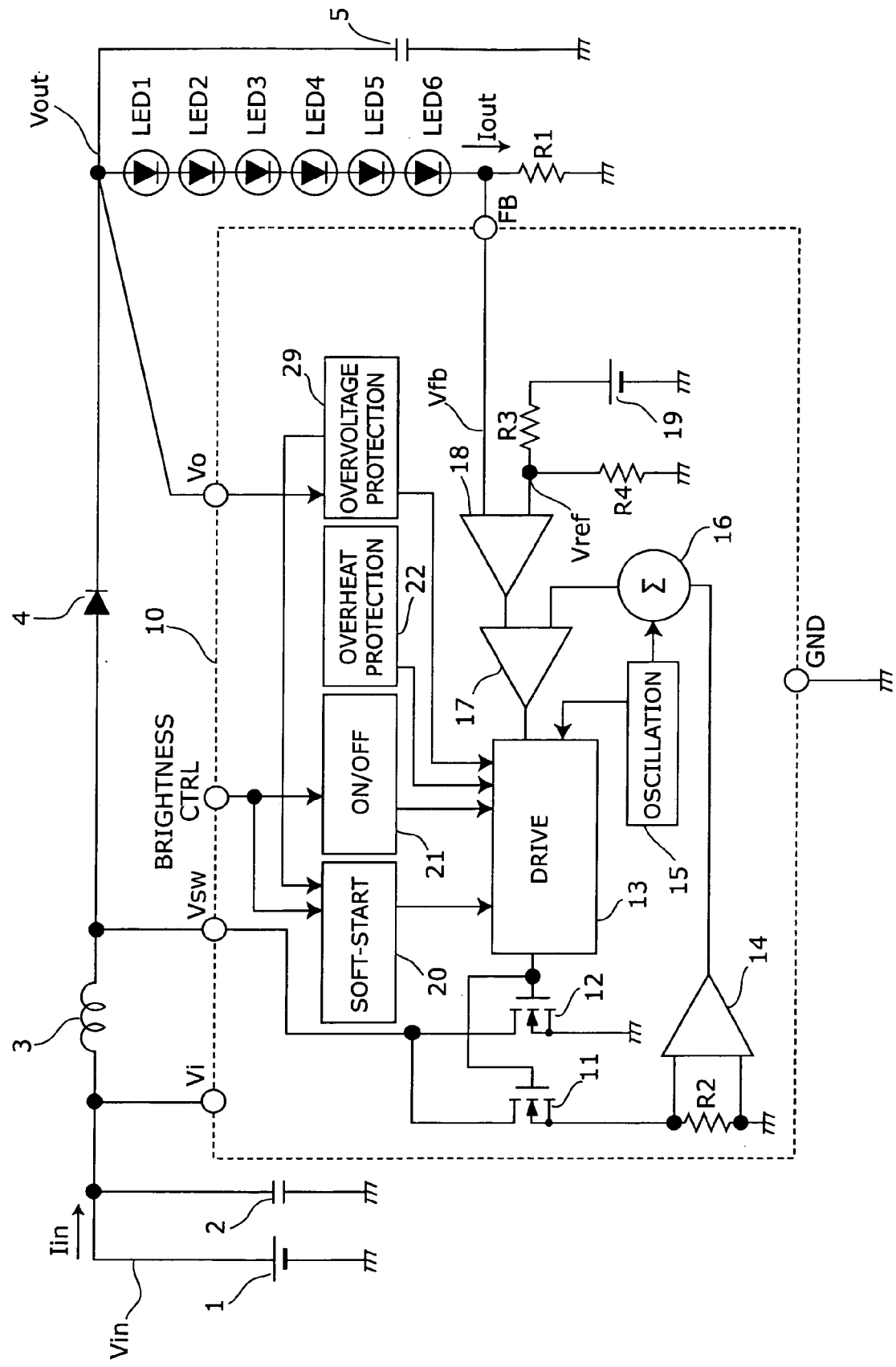
FIG. 6 is a circuit block diagram showing an electronic configuration of a power supply circuit of a third embodiment of the invention.

FIG. 6 is a circuit block diagram showing an electronic configuration of a power supply circuit of a third embodiment of the invention. In FIG. 6, such components as are found also in FIG. 1 are identified with the same reference numerals and descriptions thereof will not be repeated. The power supply circuit shown in FIG. 6 is different from the power supply circuit shown in FIG. 1 and is provided with an overvoltage protection circuit 29 capable of performing the functions of the overvoltage protection circuit 23 and the output voltage detection circuit 24 shown in FIG. 1 as well.

Figure 7:
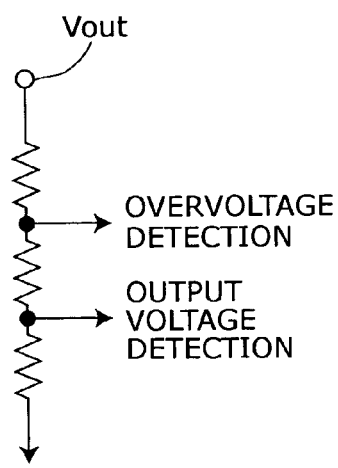
FIG. 7 is a diagram for describing an overvoltage protection circuit shown in FIG. 6.

The output voltage detection circuit 24 and the overvoltage protection circuit 23 shown in FIG. 1 feed out comparison result signals respectively after comparing the output voltage Vout with predetermined voltages preset for respective circuits. For this reason, the overvoltage protection circuit 29 shown in FIG. 6 can be easily realized by combining these two circuits. For example, as shown in FIG. 7, it can be realized by extracting predetermined voltages, one for overvoltage detection and other for output voltage detection respectively, from resistors for dividing the output voltage Vout. This way makes it possible to simplify the circuit configuration of the power supply circuit.

Figure 8:
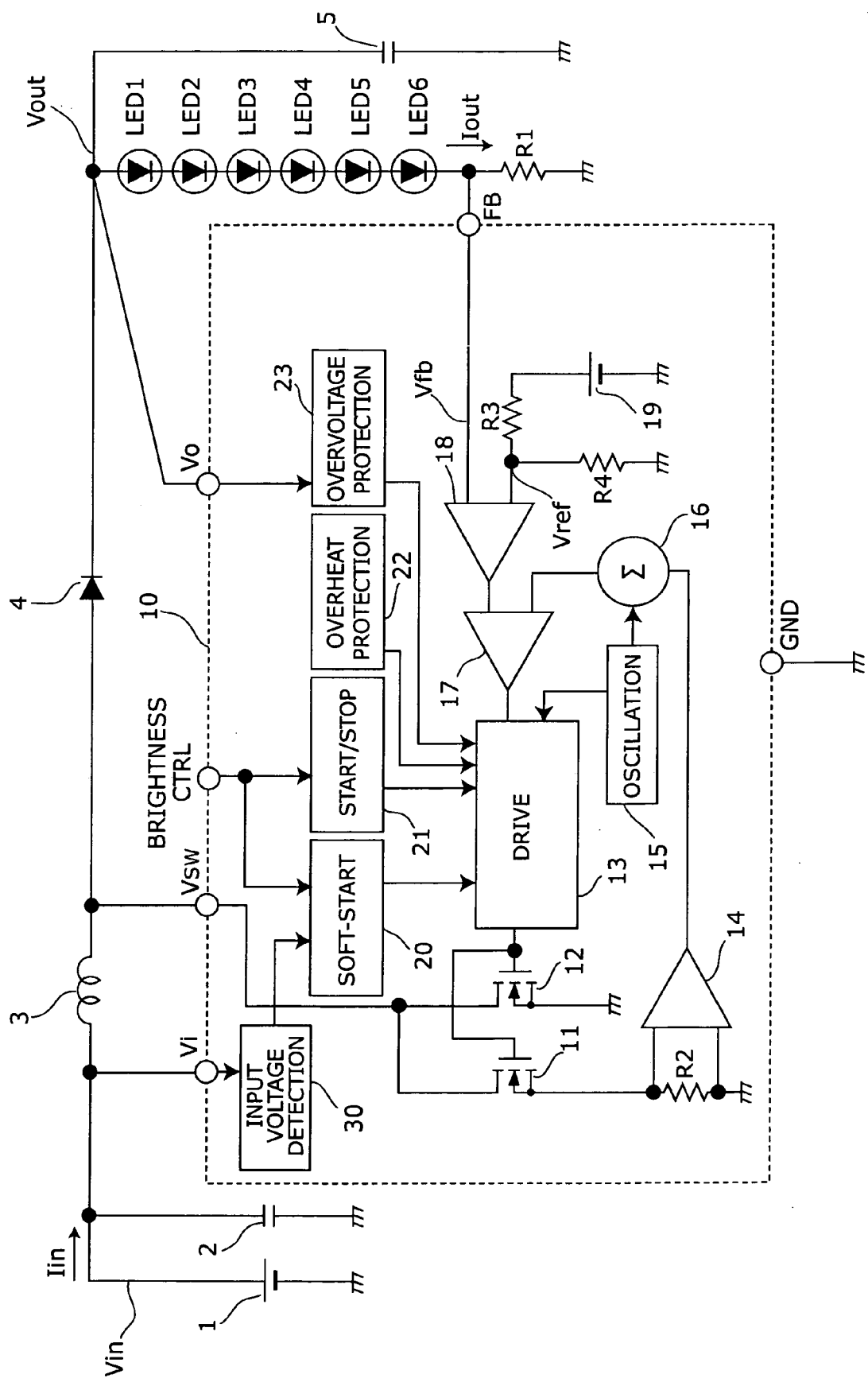
FIG. 8 is a circuit block diagram showing an electronic configuration of a power supply circuit of a fourth embodiment of the invention.

FIG. 8 is a circuit block diagram showing an electronic configuration of a power supply circuit of a fourth embodiment of the invention. In FIG. 8, such components as are found also in FIG. 1 are identified with the same reference numerals and descriptions thereof will not be repeated. The power supply circuit shown in FIG. 8 is different from the power supply circuit shown in FIG. 1 and is provided with an input voltage detection circuit 30 instead of the output voltage detection circuit 24.

The input voltage detection circuit 30 is connected between the power supply terminal Vi and the soft-start circuit 20, compares the input voltage Vin fed through the power supply terminal Vi with the set voltage Vset, and feeds the comparison result signal to the soft-start circuit 20. In the power supply circuit shown in FIG. 8, the voltage to be used for deciding whether the soft-start circuit 20 is turned to the operative state or the inoperative state is changed from the output voltage Vout in FIG. 1 to the input voltage Vin. The input voltage detection circuit 30 can be realized by configuring a similar circuit as, for example, the output voltage detection circuit 24 shown in FIG. 2 or FIG. 4 and changing the level of the set voltage Vset.

At start up (time t0 shown in FIG. 3), the input capacitor 2 is charged when the input voltage Vin is fed from the DC power source 1. Accordingly, a terminal voltage across the input capacitor 2 increases. Therefore, before the input voltage Vin reaches its upper limit, the input voltage Vin detected by the input voltage detection circuit 30 is lower than the set voltage Vset shown in FIG. 2 or FIG. 4. As a result, the input voltage detection circuit 30 feeds an "L" level comparison result signal to the soft-start circuit 20, thereby causing the soft-start circuit 20, at time t0 on the first rising edge of the brightness control signal, to turn to the operative state. The soft-start circuit 20, then, controls the drive circuit 13 so that the output voltage Vout increases gradually so as to limit the input current Iin (time t0 to time t1 in FIG. 3).

After the startup, the input voltage Vin detected by the input voltage detection circuit 30 rises higher than the set voltage Vset. Because of this, the input voltage detection circuit 30 feeds an "H" level comparison result signal to the soft-start circuit 20, thereby causing the soft-start circuit 20 to turn to the inoperative state. Consequently, the output voltage Vout rises instantaneously on the rising edge of the brightness control signal (time t3 and thereafter in FIG. 3).

In this way, the power supply circuit shown in FIG. 8 is able to increase the output voltage Vout gradually by activating the soft-start circuit 20 so as to prevent the input current Iin from increasing excessively at startup (time t0 to time t1 in FIG. 3), and increase the output voltage Vout to a desired voltage during the period in which the drive circuit 13 repeatedly turns the voltage boosting operation on and off in accordance with the brightness control signal (time t3 and thereafter in FIG. 3).

Furthermore, if the comparator 27 having a hysteresis characteristic is used for the input voltage detection circuit 30 in the power supply circuit shown in FIG. 8 and the set voltages Vset are set at 4.2 V and 3.0 V, it is possible to effectively use a lithium-ion battery of which a charge end voltage is 4.2 V and a discharge end voltage is 3.0 V.

Furthermore, when the power supply circuit embodying the invention described above is incorporated in an electronic apparatus such as a portable telephone having the white light-emitting diodes LED1 to LED6, it is possible to limit the current flowing through such a battery as a lithium-ion battery built in that electronic apparatus and make use of the battery until the voltage thereof reaches the discharge end voltage, while realizing such an electronic apparatus capable of regulating the brightness of the LED1 to LED 6.

It is to be understood that the present invention is not limited to the embodiments as described above and that within the scope of the appended claims, the invention may be practiced other than as specifically described.

As described, with this arrangement, it is possible for the soft-start circuit to become operative by detecting a low output voltage at startup and, thereby prevent a current flowing from the DC power source from becoming excessive. Once the output voltage has risen, by inactivating the soft-start circuit, it is possible to stabilize the output voltage instantaneously and supply a stabilized load current even when the drive circuit is repeatedly controlled on and off according to the external input signal.

According to the invention, the voltage booster type switching power supply circuit activates the soft-start circuit only during the first rising period of the external input signal following startup. To perform this operation, there is provided the output voltage detection circuit for feeding out a comparison result signal by comparing the output voltage with a predetermined voltage, a feedback voltage detection circuit for feeding out a comparison result signal by comparing a voltage appearing across the output current detection resistor with a predetermined voltage, or the input voltage detection circuit for feeding out a comparison result signal by comparing the input voltage with a predetermined voltage. By this arrangement, it becomes possible, with a simplified circuit, to compare the output voltage, the voltage appearing across the output current detection resistor, or the input voltage with a predetermined voltage and, based on the comparison result, securely operate the soft-start circuit only during the first rising period of the external input signal.

What is claimed is:

1. A voltage booster type switching power supply circuit for boosting an input voltage supplied from a DC power source by means of PWM (Pulse Width Modulation) method so as to supply a predetermined output voltage to a load, comprising:
   a coil having one end thereof connected to one end of the DC power source;
   a rectifying element connected between other end of the coil and one end of the load;
   an output current detection resistor for detecting current flowing through the load;
   an output capacitor, connected between a node at which the rectifying element and the load are connected together and ground, for producing the output voltage across both ends thereof by being electrically charged;
   a switching element connected between the other end of the coil and ground;
   a drive circuit for stabilizing the output voltage by controlling the switching element by means of a first PWM method in accordance with a voltage appearing across the output current detection resistor;
   a start/stop circuit for receiving an external input signal controlled by means of a second PWM method and regulating an amount of the output current by starting and stopping the drive circuit according to the external input signal fed externally thereto; and
   a soft-start circuit for receiving the external input signal, controlling the drive circuit so as to increase the output voltage gradually by becoming operative when the external input signal becomes active in a first period thereof after startup, and controlling the drive circuit so as to increase the output voltage promptly by becoming inoperative when the external input signal becomes active in a second period thereof and thereafter after startup.

2. The voltage booster type switching power supply circuit of claim 1, further comprising:
   an output voltage detection circuit that, by comparing the output voltage with a predetermined voltage, feeds to the soft-start circuit a comparison result signal being active or inactive depending on whether the output voltage is greater than the predetermined voltage or not,
   wherein the predetermined voltage is set at such a higher level than the output voltage that the comparison result signal stays inactive when the external input signal becomes active in the first period thereof after startup, and the predetermined voltage is set at such a lower level than the output voltage that the comparison result signal stays active when the external input signal becomes active in the second period thereof and thereafter after startup, and
   the soft-start circuit determines whether the comparison result signal is active or inactive on each rising edge of the external input signal and becomes inoperative or operative according to the determination.

3. The voltage booster type switching power supply circuit of claim 2, further comprising:

an overvoltage protection circuit for halting operation of the drive circuit when the output voltage becomes higher than a predetermined level set for overvoltage protection.

4. The voltage booster type switching power supply circuit of claim 3, wherein the overvoltage protection circuit is included in the output voltage detection circuit.

5. The voltage booster type switching power supply circuit of claim 1, further comprising:

an output voltage detection circuit that, by comparing the output voltage with a reference voltage, feeds to the soft-start circuit a comparison result signal being active or inactive depending on whether the output voltage is greater than the reference voltage, wherein the reference voltage changes in a hysteresis loop so that the reference voltage becomes a first predetermined voltage at startup and, thereafter, alternates between a second predetermined voltage and the first predetermined voltage upon each inversion of the comparison result signal;

the first predetermined voltage is set at such a higher level than the output voltage that the comparison result signal stays inactive when the external input signal becomes active in the first period thereof after startup, and the second predetermined voltage is set at such a lower level than the output voltage that the comparison result signal stays active when the external input signal becomes active in the second period thereof and thereafter after startup; and the soft-start circuit determines whether the comparison result signal is active or inactive on each rising edge of the external input signal and becomes inoperative or operative according to the determination.

6. The voltage booster type switching power supply circuit of claim 5, the first predetermined voltage is 4.2 V and the second predetermined voltage is 3.0 V.

7. The voltage booster type switching power supply circuit of claim 1, further comprising:

a feedback voltage detection circuit that, by comparing a feedback voltage appearing across the output current detection resistor with a predetermined voltage, feeds to the soft-start circuit a comparison result signal being active or inactive depending on whether the feedback voltage is greater than the predetermined voltage or not, wherein the predetermined voltage is set at such a higher level than the feedback voltage that the comparison result signal stays inactive when the external input signal becomes active in the first period thereof after startup, and the predetermined voltage is set at such a lower level than the feedback voltage that the comparison result signal stays active when the external input signal becomes active in the second period thereof and thereafter after startup, and the soft-start circuit determines whether the comparison result signal is active or inactive on each rising edge of the external input signal and becomes inoperative or operative according to the determination.

8. The voltage booster type switching power supply circuit of claim 1, further comprising:

an feedback voltage detection circuit that, by comparing the feedback voltage with a reference voltage, feeds to the soft-start circuit a comparison result signal being active or inactive depending on whether the feedback voltage is greater than the reference voltage, wherein the reference voltage changes in a hysteresis loop so that the reference voltage becomes a first predetermined voltage at startup and, thereafter, alternates between a second predetermined voltage and the first predetermined voltage upon each inversion of the comparison result signal;

the first predetermined voltage is set at such a higher level than the feedback voltage that the comparison result signal stays inactive when the external input signal becomes active in the first period thereof after startup, and the second predetermined voltage is set at such a lower level than the feedback voltage that the comparison result signal stays active when the external input signal becomes active in the second period thereof and thereafter after startup; and the soft-start circuit determines whether the comparison result signal is active or inactive on each rising edge of the external input signal and becomes inoperative or operative according to the determination.

9. The voltage booster type switching power supply circuit of claim 1, further comprising:

an input voltage detection circuit that, by comparing the input voltage with a predetermined voltage, feeds to the soft-start circuit a comparison result signal being active or inactive depending on whether the input voltage is greater than the predetermined voltage or not, wherein the predetermined voltage is set at such a higher level than the input voltage that the comparison result signal stays inactive when the external input signal becomes active in the first period thereof after startup, and the predetermined voltage is set at such a lower level than the input voltage that the comparison result signal stays active when the external input signal becomes active in the second period thereof and thereafter after startup, and the soft-start circuit determines whether the comparison result signal is active or inactive on each rising edge of the external input signal and becomes inoperative or operative according to the determination.

10. The voltage booster type switching power supply circuit of claim 1, further comprising:

an input voltage detection circuit that, by comparing the input voltage with a reference voltage, feeds to the soft-start circuit a comparison result signal being active or inactive depending on whether the input voltage is greater than the reference voltage, wherein the reference voltage changes in a hysteresis loop so that the reference voltage becomes a first predetermined voltage at startup and, thereafter, alternates between a second predetermined voltage and the first predetermined voltage upon each inversion of the comparison result signal;

the first predetermined voltage is set at such a higher level than the input voltage that the comparison result signal stays inactive when the external input signal becomes active in the first period thereof after startup, and the second predetermined voltage is set at such a lower level than the input voltage that the comparison result signal stays active when the external input signal becomes active in the second period thereof and thereafter after startup; and the soft-start circuit determines whether the comparison result signal is active or inactive on each rising edge of the external input signal and becomes inoperative or operative according to the determination.

11. The voltage booster type switching power supply circuit of claim 10, wherein the first predetermined voltage is 4.2 V and the second predetermined voltage is 3.0 V.

12. The voltage booster type switching power supply circuit of claim 1, wherein the load is a light-emitting element as providing a light source for a liquid crystal display device, the external input signal is a brightness control signal for adjusting brightness of the light-emitting element, and the start/stop circuit is a brightness control circuit for the light-emitting element.

* * * * *